United States Patent Office 3,824,127
Patented July 16, 1974

3,824,127
DISC CAPACITOR SILVER COMPOSITIONS
Joel Alfred Conwicke, Youngstown, N.Y., assignor to E. I. du Pont de Nemours and Company, Wilmington, Del.
No Drawing. Filed Dec. 22, 1971, Ser. No. 211,079
Int. Cl. H01b 1/02; H01g 1/00
U.S. Cl. 117—227                               6 Claims

ABSTRACT OF THE DISCLOSURE

In silver metallizing compositions useful in producing electrodes for disc capacitors, the improvement of adding nickel, tantalum or mixtures thereof to prevent sticking between electrodes of contiguous capacitors during firing. A process using such improved compositions and disc capacitors made therewith.

BACKGROUND OF THE INVENTION

This invention relates to metallizing compositions, and more particularly, to silver-containing metallizing compositions useful as electrodes in disc capacitors.

Electronic devices often include disc capacitors and other active elements attached to metallized substrates. General information and performance data regarding disc capacitors are contained, e.g., in a pamphlet entitled "Disc and Tubular Capacitors," Centralab, 42–DO–1106CA, 1967. Typically, disc capacitors comprise a dielectric disc metallized on each side with an electrode, which electrodes are solderable to a substrate. Typical dielectric discs are largely composed of barium titanate or titanium dioxide. Normally, the dielectric disc not only contains major quantities of barium titanate or titanium dioxide (which dominate the dielectric properties of the disc), but also normally contains a number of additives which modify those properties, e.g., $CaTiO_3$, $PbTiO_3$, $Bi_2(SnO_3)_3$, etc. Normally the powder ingredients of the dielectric are mixed together and dry pressed into the form of a disc, typically 1–10 mils thick and 0.25–1.0 inch in diameter. The disc is then sintered at relatively high temperature (e.g., 1300–1400° C.) to form a dense ceramic.

Silver is commonly employed as the electrode metal for disc capacitors. Silver compositions can be applied to each side of a fired (sintered) ceramic substrate by any of the commonly employed methods such as screen printing or spraying. Such silver compositions contain finely divided silver particles and inorganic binders ($Bi_2O_3$ and glass frit), usually dispersed in a carrier or vehicle of rheology suitable for the application method chosen. The inorganic binders function to bind the silver particles, upon firing, to the dielectric body.

After the silver metallizing composition is applied to the fired dielectric disc, the metallized disc is normally fired at temperatures in the range 750–820° C., which firing sinters the silver and gives a strongly adherent, solderable electrode on the disc.

Problems have heretofore been experienced in the firing of the metallized discs to form capacitors. In production the metallized discs are randomly stacked or poured onto the belt of a belt furnace. Often electrodes of various bodies contact one another, and such contiguous electrodes stick upon being fired. Although not intended to be limiting, it is thought that such sticking may result from silver/silver diffusion or from the interaction between the silver/binder system of one electrode with that of another. Whatever the cause of the sticking, often when stuck capacitors are broken apart the electrode of at least one capacitor will be torn. This, of course, reduces the yield of usable capacitors. In view of this sticking problem, there is a need for silver compositions which will yield solderable discs capacitors which do not stick upon firing, as well as a process for producing the same and the resultant capacitors.

SUMMARY OF THE INVENTION

This invention relates to improved metallizing compositions, a process for formation of electrodes of disc capacitors therewith, and the disc capacitors made thereby.

In silver metallizing compositions useful for preparing solderable disc capacitor electrodes, which compositions comprise silver powder, $Bi_2O_3$ and glass frit, this invention is the improvement of incorporating as an additive at least about 0.01%, based on the weight of silver, of nickel, tantalum or mixtures thereof. Preferred compositions comprise, based on the weight of silver, (a) an amount of nickel in the range of about 0.01–10.5%,
(b) an amount of tantalum in the range of about 0.01–4.1%, or
(c) an amount of a mixture of tantalum and nickel in the range of about 0.01–10.5%, provided that the amount of tantalum does not exceed about 4.1%.

In a process for the formation of disc capacitors having silver electrodes which comprises depositing on a dielectric substrate a metallizing composition of silver, $Bi_2O_3$ and glass frit and then firing the bodies to sinter the electrodes, this invention is the improvement of using the above metallizing compositions, whereby during said firing step the tendency of contiguous electrodes to adhere to one another is reduced.

DETAILED DESCRIPTION OF THE INVENTION

The improved silver compositions of the present invention are used to prepare electrodes which do not stick to one another during firing (sintering). The resultant electrodes must be solderable, and hence there is in practice an upper limit on the amount of nickel or tantalum included in the composition, said upper limit being dependent on the particular solder to be employed and the degree of solderability desired. General upper limits on such additives are set forth above. Normally for a given system much less tantalum than nickel can be tolerated.

The mechanism by which nickel or tantalum (or mixtures thereof) is effective in the present invention is not understood. Although not intended to be limiting, it is speculated that the additives, each insoluble in silver, may oxidize during firing to form a layer which separates adjacent electrodes. Alternately, the additive may cause embrittlement of the silver metallization, resulting in more facile separation of the electrodes (as when a stack is tipped over after firing). Either nickel or tantalum may be supplied as an alloy, e.g. 50/50 Ni/Al, 50/50 Ni/B, Ni/Ta, etc.

Silver compositions useful for metallizing disc capacitor dielectrics in preparing continuous films in the ultimate fired structures comprise finely divided silver powder, and a finely divided inorganic binder (glass frit and bismuth oxide). The metal and binder are generally each sufficiently finely divided to pass through a No. 100 screen (U.S. standard sieve scale), or smaller. Often 40–70% by weight of the silver and 5–15% by weight of inorganic binder are dispersed in an inert vehicle. Any conventional components and proportions of ingredients may be included in the metallizing compositions of this invention consistent with the aim of preparing solderable capacitors.

In preparing the metallizing compositions, it is desirable, although not necessary, to disperse the solids in a vehicle. Any inert liquid may be utilized as a vehicle.

Water or any one of various organic liquids, with or without thickening and/or stabilizing, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resin such as polymethacrylates of lower alcohols, or solutions of ethyl cellulose, and solvents such as pine oil and the monobutyl ether of ethylene glycol monoacetate. The vehicle may contain or be composed of volatile liquids to promote fast setting after application; or it may contain waxes, thermoplastic resins or the like materials which are thermofluids so that the vehicle-containing composition may be applied at elevated temperatures to a relatively cold ceramic body upon which the composition sets immediately.

The proportions of vehicle to solids in the metallizing compositions may vary considerably depending upon the manner in which the paint or paste is to be applied and the kind of vehicle used. Generally, from 30–90% solids are dispersed in from 70–10% by weight of the inert liquid vehicle.

After preparation of the disc dielectric material pursuant to known techniques, it is metallized with the silver composition of the present invention, and then the metallized substrate is fired (normally in a belt furnace) to sinter the electrodes.

EXAMPLES AND COMPARATIVE SHOWINGS

The present invention is illustrated by the following examples, and is to be contrasted with the comparative showings which are not of the present invention. Below and elsewhere in the specification and appended claims, all parts, percentages and ratios are by weight, unless otherwise indicated.

To provide a uniform basis for comparison between the examples of the present invention and the comparative showings, a conventional disc capacitor silver metallizing composition was used throughout the examples and comparative showings, with and without additives. Also a conventional disc dielectric was used throughout (titanium dioxide). That silver composition ( hereinafter referred to as "silver composition A") contained the following finely divided materials (pass through No. 325 screen, U.S. standard sieve scale): 50 parts silver, 9.0 parts $Bi_2O_3$, 2.2 parts of a glass frit containing 63.2% CdO, 7.4% $Na_2O$, 16.6% $B_2O_3$, 0.7% $Al_2O_3$, and 12.8% $SiO_2$ and 38.8 parts of a mixture of about 90 parts ethyl cellulose and 10 parts beta-terpineol as a vehicle.

The $TiO_2$ dielectric disc was ½-inch in diameter and 5 mils thick and had been sintered prior to the application of electrode metallizing composition thereto.

SERIES A

A series of metallizing compositions was prepared by mixing 0.1, 0.5, 1.0 and 5.0 parts, respectively, of nickel powder (—200 mesh), plus sufficient of silver composition A to make 100 parts. A second series was made containing 1.0 part zinc, tantalum, iron, copper, aluminum or selenium, respectively, (—200 mesh) and 99 parts of silver composition A.

Each mixture was thoroughly blended in a Hoover Mueller and screen printed (No. 165 screen) on each side of a series of $TiO_2$ discs.

A similar series of $TiO_2$ substrates was metallized with silver composition A, as a control.

For each metallizing composition, a series of metallized electrodes was stacked ten high and the stack was fired between 760 and 800° C. (total heating cycle 30–45 minutes, 4–8 minutes at peak temperature). Tendency to stick was observed simply by tipping the fired stack over and noting the ease with which the individual capacitors separated from one another.

Only the compositions of the present invention, those containing nickel or tantalum, prevented electrode sticking. Capacitors electroded with additives not of the present invention (zinc, iron, copper, aluminum and selenium, respectively) were badly stuck together, and would not come apart with moderate pressure. Capacitors electroded with silver composition A (no additives) were so badly stuck together that they would not come apart. Thus, the use of silver composition A either without additive or with the above additives other than nickel and tantalum, is not acceptable.

An alloy of nickel and aluminum (50/50 by weight) was found to be effective, in similar tests, in preventing electrode sticking (1 part of alloy to 99 parts of silver composition A).

SERIES B

A second series of runs was carried out as in Series A, using either 1.0% NiO or 1.0% nickel. The capacitors were fired at 800° C. (½-hour cycle, 4 minutes at peak temperature). Capacitors metallized with the nickel metal-containing compositions again showed no sticking, while those metallized with NiO-containing compositions stuck together. Moderate pressure was required to separate the fired NiO-containing capacitors, indicating improvement over unmodified silver compositions, but inferiority to the nickel metal-containing compositions of the present invention.

SERIES C

The solderability of fired capacitors metallized with the nickel- and tantalum-containing compositions in Series A was studied and found to be good at the additive levels used therein. Solderability was tested in a solder bath at 220° C., 4-second dip, 62/36/2 Sn/Pb/Ag solder using Dutch Boy No. 115 flux. Similarly the dissipation factors for the capacitors of the present invention produced in Series A were found to be excellent (dissipation factors were below 2% in nearly all instances using a General Radio Capacitance Bridge at 1 kHz).

I claim:

1. In silver metallizing compositions useful for preparing solderable disc capacitor electrodes, which compositions consist essentially of silver powder, $Bi_2O_3$ and glass frit, the improvement of incorporating as an additive at least about 0.01%, based on the weight of silver, of nickel, tantalum or mixtures thereof, there being 40–70 parts by weight of silver per 5–15 parts of $Bi_2O_3$ plus glass frit.

2. A composition according to claim 1 comprising, based on the weight of silver,
   (a) an amount of nickel in the range of about 0.01–10.5%,
   (b) an amount of tantalum in the range of about 0.01–4.1%, or
   (c) an amount of a mixture of tantalum and nickel in the range of about 0.01–10.5%, provided that the amount of tantalum does not exceed about 4.1%.

3. A composition according to Claim 1 comprising, having silver electrodes which comprises depositing on a dielectric substrate a metallizing composition of silver, $Bi_2O_3$ and glass frit and then firing the bodies to sinter the electrodes, the improvement of using a metallizing composition which has incorporated therein as an additive at least about 0.01%, based on the weight of silver, of nickel, tantalum or mixtures thereof, there being 40–70 parts by weight of silver per 5–15 parts of $Bi_2O_3$ plus glass frit, whereby during said firing step the tendency of contiguous electrodes to adhere to one another is reduced.

4. A process according to Claim 3 wherein the metallizing composition comprises, based on the weight of silver,
   (a) an amountt of nickel in the range of about 0.01–10.5%,
   (b) an amount of tantalum in the range of about 0.01–4.1%, or
   (c) an amount of a mixture of tantalum and nickel in the range of about 0.01–10.5%, provided that the amount of tantalum does not exceed about 4.1%.

5. Disc capacitors comprising a dielectric body having thereon silver electrodes consisting essentially of silver, $Bi_2O_3$, glass frit and an additive of at least 0.01%, based on the weight of silver, of nickel, tantalum or mixtures thereof, there being 40–70 parts by weight of silver per 5–15 parts of $Bi_2O_3$ plus glass frit.

6. Disc capacitors according to Claim 5 wherein the additive is, based on the weight of silver,
   (a) an amount of nickel in the range of about 0.01–10.5%,
   (b) an amount of tantalum in the range of about 0.01–4.1%, or
   (c) an amount of a mixture of tantalum and nickel in the range of about 0.01–10.5%, provided that the amount of tantalum does not exceed about 4.1%.

References Cited

UNITED STATES PATENTS

| | | | |
|---|---|---|---|
| 3,673,117 | 6/1972 | Schroeder | 117—227 |
| 3,620,840 | 11/1971 | Schroeder | 117—227 |
| 3,484,284 | 12/1969 | Dates | 117—227 |
| 3,755,723 | 8/1973 | Short | 317—258 |
| 3,725,308 | 3/1973 | Ostolski | 252—514 |
| 2,993,266 | 7/1961 | Berry | 317—258 |
| 2,750,657 | 6/1956 | Herbert | 317—258 |

LEON D. ROSDOL, Primary Examiner

M. F. ESPOSITO, Assistant Examiner

U.S. Cl. X.R.

317—242, 258, 261; 252—513, 514; 117—160 R

PO-1050
(5/69)

UNITED STATES PATENT OFFICE
CERTIFICATE OF CORRECTION

Patent No. 3,824,127     Dated July 16, 1974

Inventor(s) Joel Alfred Conwicke

It is certified that error appears in the above-identified patent and that said Letters Patent are hereby corrected as shown below:

Delete line 56, column 4, and substitute therefor -- In a process for the formation of disc capacitors --.

Signed and sealed this 19th day of November 1974.

(SEAL)
Attest:

McCOY M. GIBSON JR.
Attesting Officer

C. MARSHALL DANN
Commissioner of Patents